US010825176B2

(12) United States Patent
Shiroishi et al.

(10) Patent No.: US 10,825,176 B2
(45) Date of Patent: Nov. 3, 2020

(54) MEDICAL IMAGE PROCESSING APPARATUS, METHOD FOR PROCESSING MEDICAL IMAGE, AND MEDICAL IMAGE PROCESSING SYSTEM

(71) Applicant: CANON MEDICAL SYSTEMS CORPORATION, Otawara-shi (JP)

(72) Inventors: Ryo Shiroishi, Nasushiobara (JP); Takuma Igarashi, Nasushiobara (JP); Naotaka Sakashita, Utsunomiya (JP)

(73) Assignee: CANON MEDICAL SYSTEMS CORPORATION, Otawara-shi (JP)

( * ) Notice: Subject to any disclaimer, the term of this patent is extended or adjusted under 35 U.S.C. 154(b) by 49 days.

(21) Appl. No.: 16/351,586

(22) Filed: Mar. 13, 2019

(65) Prior Publication Data

US 2019/0287245 A1 Sep. 19, 2019

(30) Foreign Application Priority Data

Mar. 13, 2018 (JP) .................................. 2018-044937

(51) Int. Cl.
*G06T 7/00* (2017.01)
*G06T 7/11* (2017.01)

(52) U.S. Cl.
CPC .............. *G06T 7/0014* (2013.01); *G06T 7/11* (2017.01); *G06T 2207/10088* (2013.01); *G06T 2207/20128* (2013.01); *G06T 2207/30016* (2013.01)

(58) Field of Classification Search
CPC ..... A61B 8/5223; A61B 6/469; G06T 7/0012; G06T 7/0014
See application file for complete search history.

(56) References Cited

U.S. PATENT DOCUMENTS 7,162,063 B1* 1/2007 Craine .................. G06T 7/0012
128/922
7,762,946 B2* 7/2010 Sugimoto ............ A61B 1/0005
348/65

(Continued)

FOREIGN PATENT DOCUMENTS

JP          2008-519639          6/2008

OTHER PUBLICATIONS

S. Murphy, et al., "Fast, Simple, Accurate Multi-atlas Segmentation of the Brain", Biomedical Image Registration. WBLR2014. Lecture Notes in Computer Science, vol. 8545,2014, 10 pages.

*Primary Examiner* — Yosef Kassa
(74) *Attorney, Agent, or Firm* — Oblon, McClelland, Maier & Neustadt, L.L.P.

(57) ABSTRACT

A medical image processing apparatus according to a present embodiment includes processing circuitry. The processing circuitry is configured to: acquire a subject image relating to a subject; acquire a standard image indicating a morphological structure of a human body and sections of a morphological structure from a memory which stores each standard image in association with sections of a morphological structure; set a comparison target portion of the subject image based on the subject image; set a comparison target portion of the standard image based on a comparison between the subject image and the standard image; specify a section in the comparison target portion of the subject image based on a comparison between the comparison target portion of the subject image and the comparison target portion of the standard image; and output the subject image and the section in association with each other.

15 Claims, 11 Drawing Sheets

STANDARD IMAGE

POSITION CORRESPONDENCE
⟵⟶

ATLAS IMAGE

(56) References Cited

U.S. PATENT DOCUMENTS

| | | | |
|---|---|---|---|
| 7,844,301 B2* | 11/2010 | Lee | G06F 1/1616 |
| | | | 345/1.1 |
| 7,942,811 B2* | 5/2011 | Segawa | A61B 1/00016 |
| | | | 600/117 |
| 8,152,710 B2* | 4/2012 | Dlugos, Jr. | A61F 5/0059 |
| | | | 600/37 |
| 8,334,921 B2* | 12/2012 | Hiratsuka | H04N 1/32112 |
| | | | 348/231.3 |
| 8,565,859 B2* | 10/2013 | Wang | A61B 6/00 |
| | | | 382/128 |
| 2009/0067692 A1 | 3/2009 | Breeuwer et al. | |

* cited by examiner

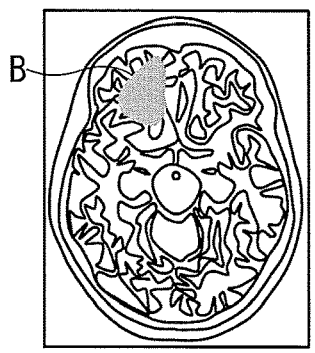
SUBJECT IMAGE
FIG. 4
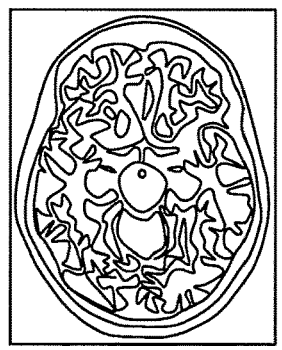 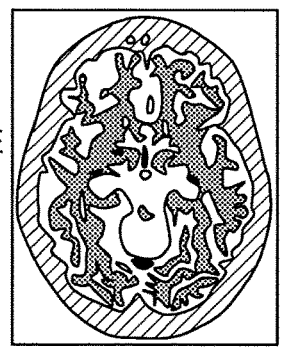
STANDARD IMAGE ⟷ POSITION CORRESPONDENCE ⟷ ATLAS IMAGE
FIG. 5
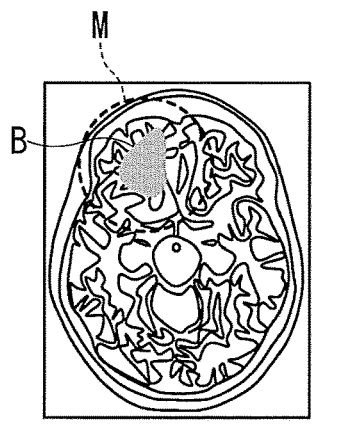 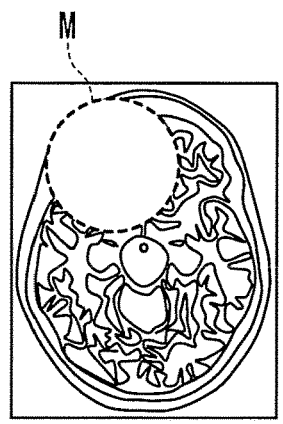
SUBJECT IMAGE IN WHICH
EXCLUSION MASK IS SET
PARTIAL SUBJECT IMAGE
FIG. 6A     FIG. 6B

PARCELED IMAGE          PARCELED IMAGE

PARCELED IMAGE

TRACTOGRAPHY

MEDICAL IMAGE PROCESSING APPARATUS, METHOD FOR PROCESSING MEDICAL IMAGE, AND MEDICAL IMAGE PROCESSING SYSTEM

CROSS-REFERENCE TO RELATED APPLICATION

This application is based upon and claims the benefit of priority from Japanese Patent Application No. 2018-044937, filed on Mar. 13, 2018, the entire contents of each of which are incorporated herein by reference.

FIELD

An embodiment as an aspect of the present invention relates to a medical image processing apparatus, a method for processing a medical image and a medical image processing system.

BACKGROUND

The medical image processing apparatus is able to appropriately perform an image processing and display a subject image generated by the medical image diagnostic apparatus such as an X-ray computed tomography (CT) apparatus, a magnetic resonance imaging (MRI) apparatus, or the like. For example, in the medical image processing apparatus, as an image processing technology used for analyzing a subject image (for example, a T1W image) including a brain region generated by the MRI apparatus, there is a processing of performing a parcellation of the brain region of the subject into multiple sections (parcels) by using the structural connectivity, the functional connectivity or the effective connectivity of the brain region.

The parcellation processing of the subject image is used for localization of a specific brain part, local measurement of brain-related various measurement indexes, region comparison, etc. in terms of medical research and clinical. The medical image processing apparatus is capable to specify the section related to the subject image based on the subject image, a standard image and an atlas image. The atlas image is an image in which a region is preliminarily partitioned.

BRIEF DESCRIPTION OF THE DRAWINGS

FIG. 4 is a diagram showing an example of a subject image in the medical image processing apparatus according to the embodiment.

FIG. 5 is a diagram showing an example of a set of a standard image and an atlas image in the medical image processing apparatus according to the embodiment.

Each of FIGS. 6A and 6B is a diagram for explaining a method of generating the partial subject image based on the subject image in the medical image processing apparatus according to the embodiment.

Figure 7:
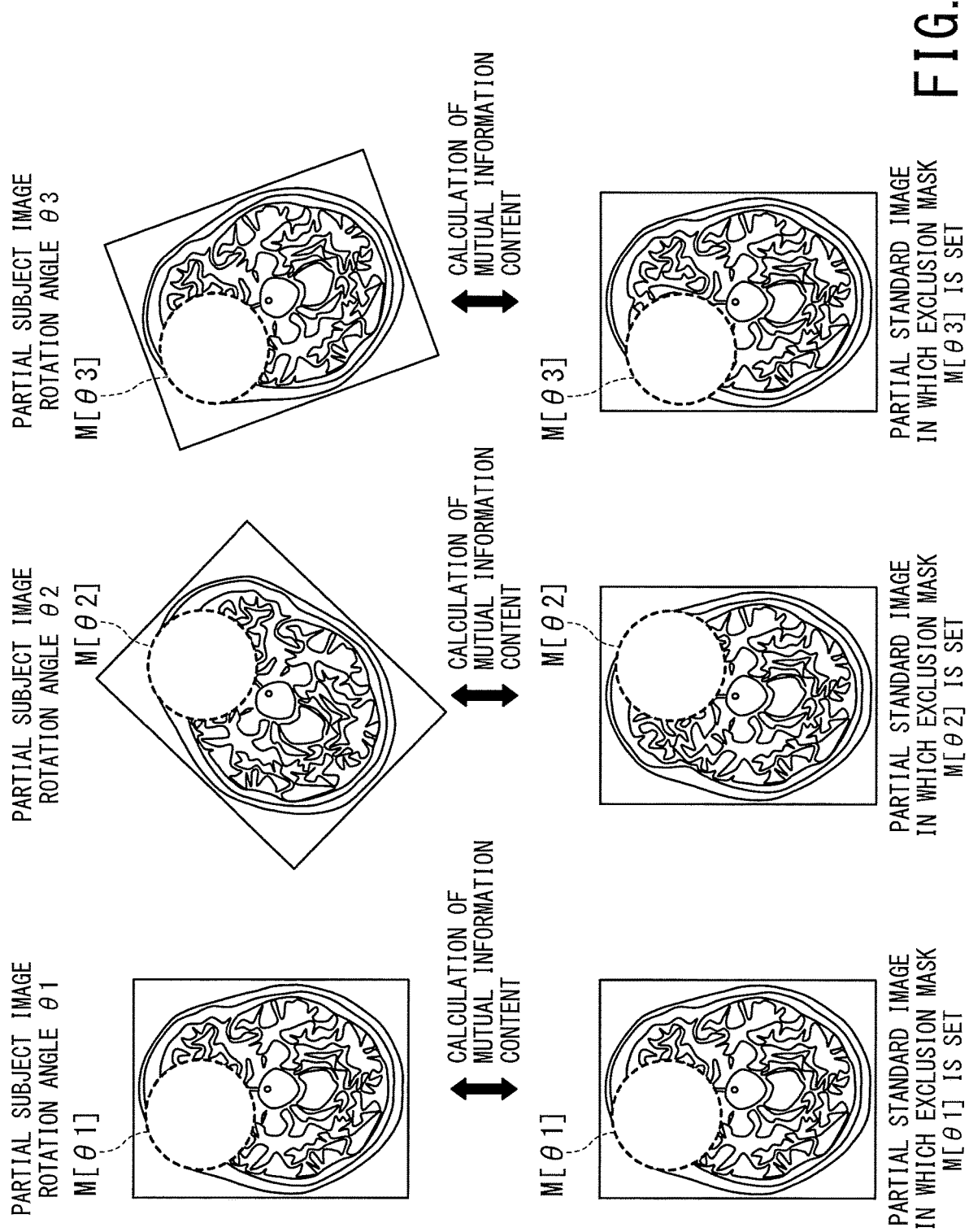

FIG. 7 is a diagram for explaining a method of the rigid registration in the medical image processing apparatus according to the embodiment.

Figure 8:
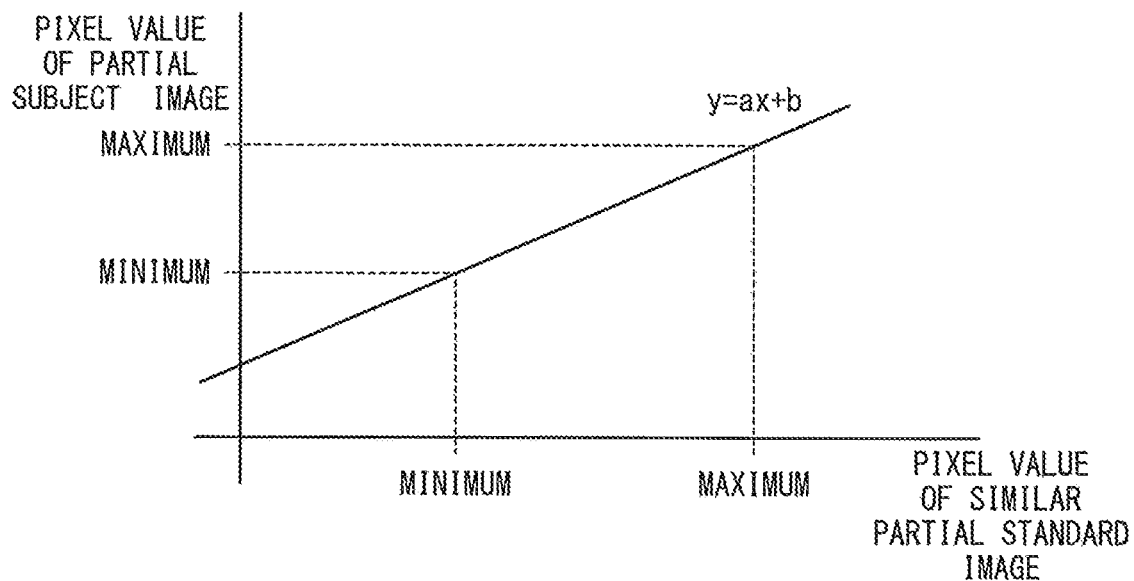

FIG. 8 is a graph showing a conversion formula for linearly converting pixel values in the medical image processing apparatus according to the embodiment.

Figure 9:
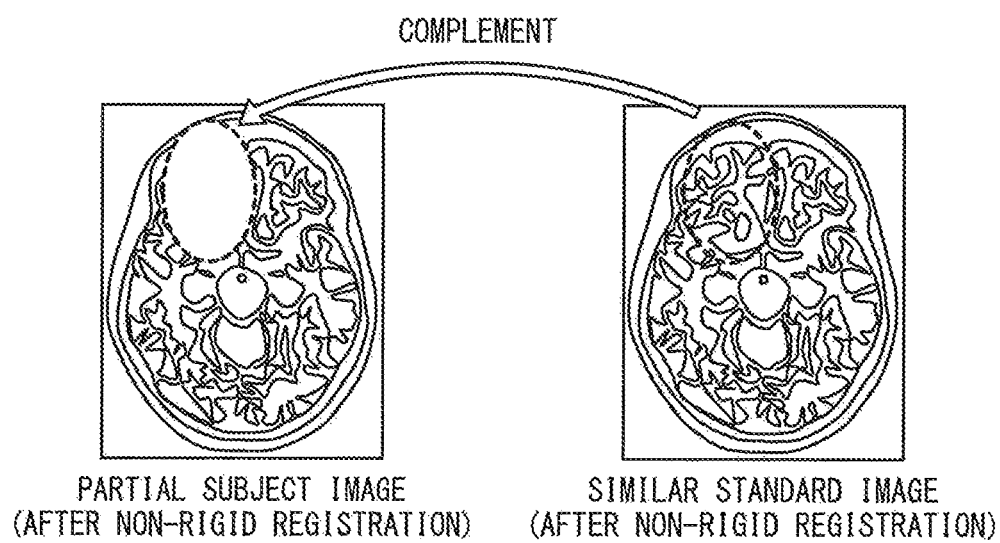

FIG. 9 is a diagram for explaining a method of complementing pixel values in the medical image processing apparatus according to the embodiment.

Figure 10A:
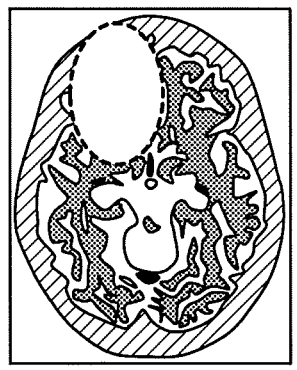
Figure 10B:
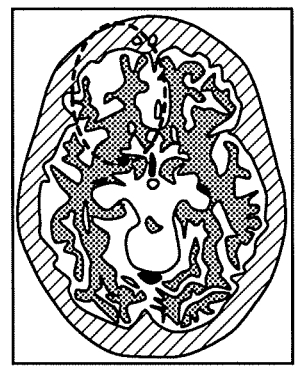

Each of FIGS. 10A and 10B is a diagram showing an example of a parceled image in the medical image processing apparatus according to the embodiment.

Figure 11:
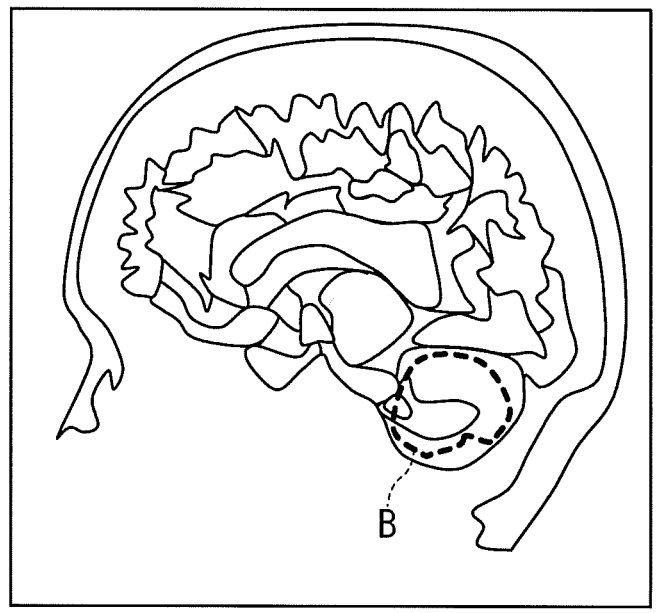

FIG. 11 is a diagram showing an example of a parceled image.

Figure 12:
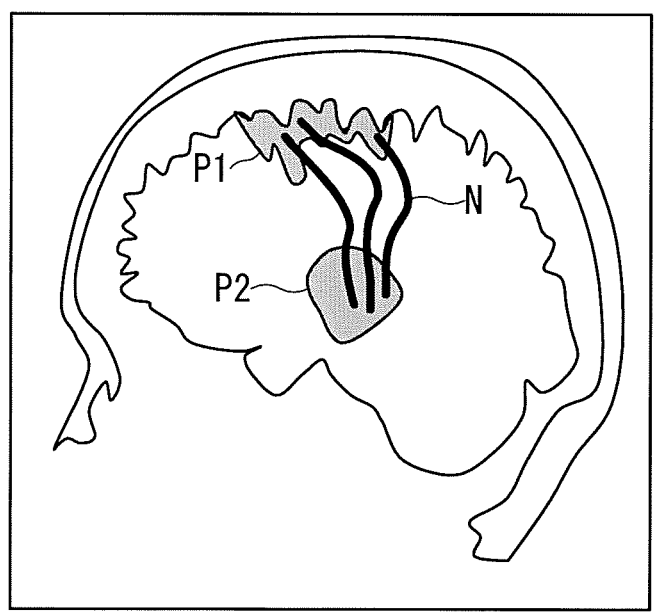

FIG. 12 is a diagram showing an example of a tractography.

Figure 13:
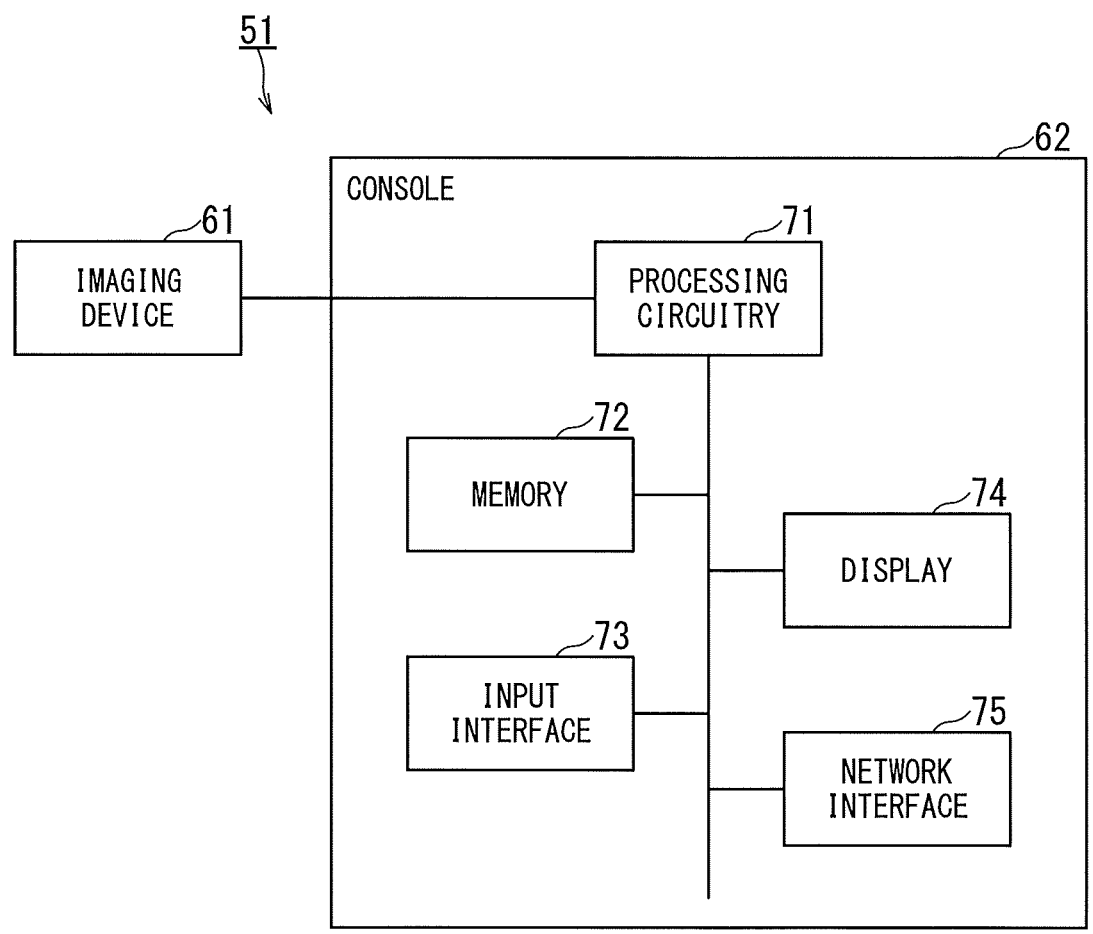

FIG. 13 is a schematic diagram showing a configuration example of a medical image diagnostic apparatus according to an embodiment.

Figure 14:
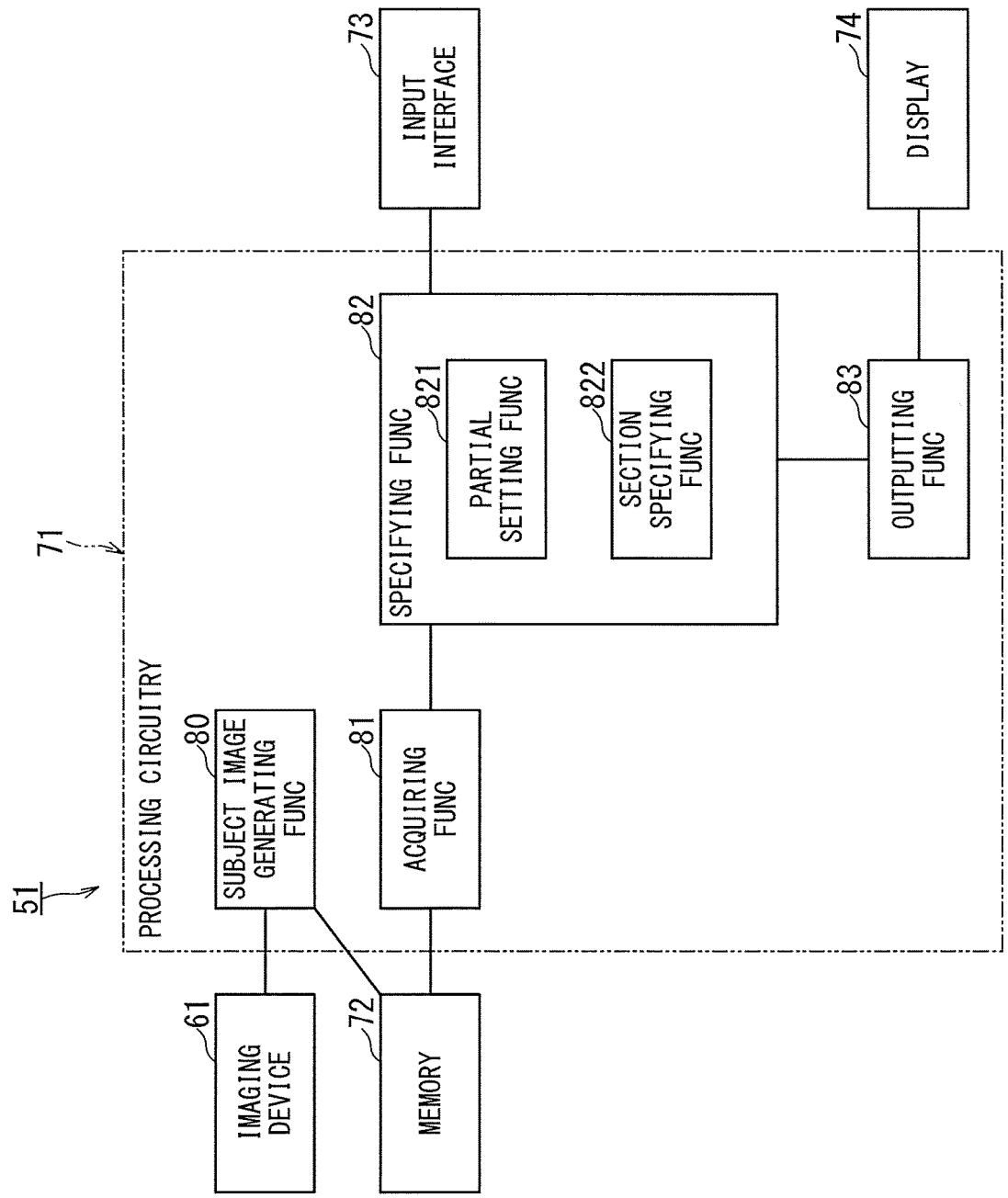

FIG. 14 is a block diagram showing functions of the medical image diagnostic apparatus according to the embodiment.

Figure 15:
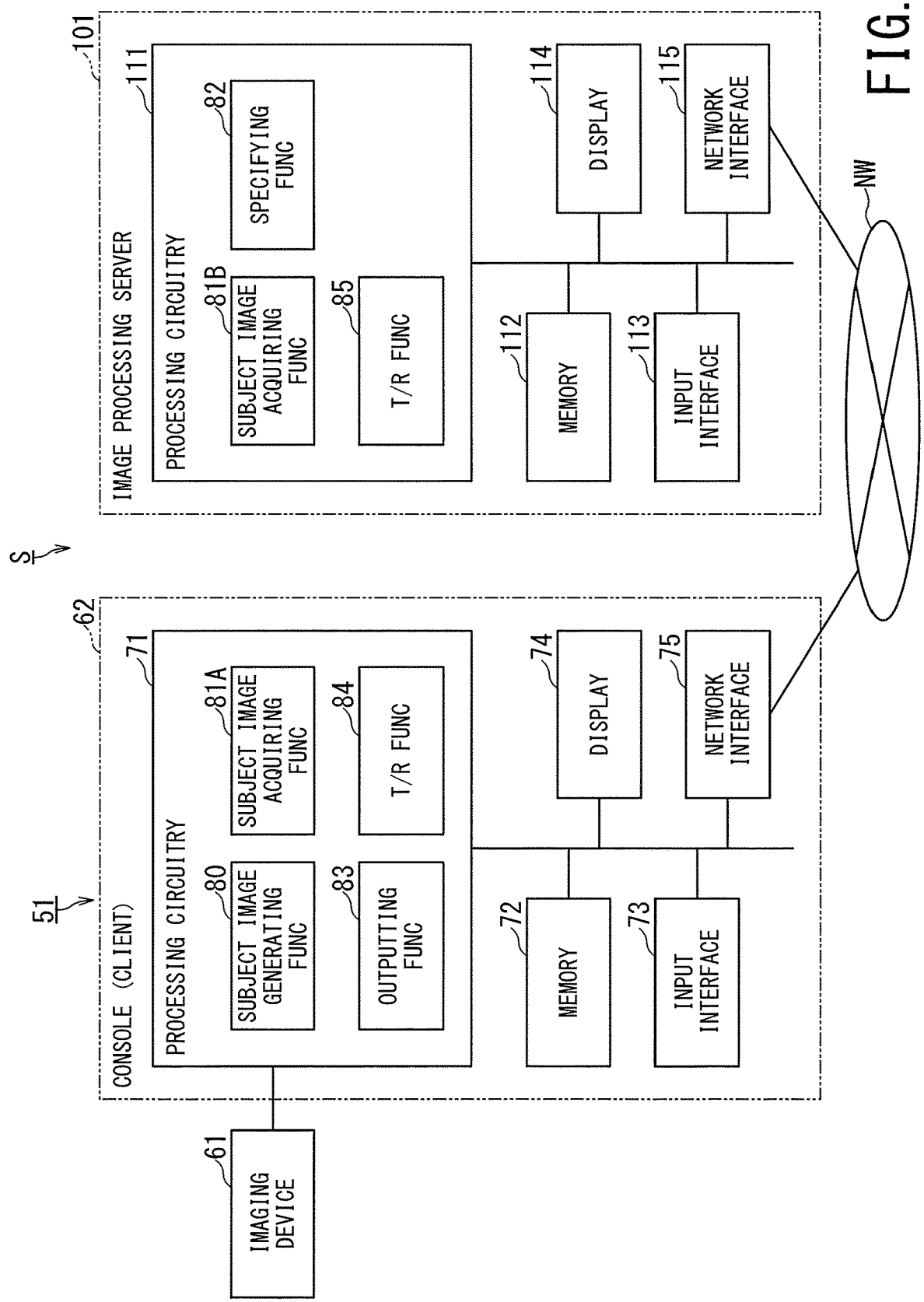

FIG. 15 is a schematic diagram showing a configuration example and functions showing a medical image processing system according to an embodiment.

DETAILED DESCRIPTION

A medical image processing apparatus, a method for processing a medical image and a medical image processing system according to a present embodiment will be described with reference to the accompanying drawings.

A medical image processing apparatus according to a present embodiment includes processing circuitry. The processing circuitry is configured to: acquire a subject image relating to a subject; acquire a standard image indicating a morphological structure of a human body and sections of a morphological structure from a memory which stores each standard image in association with sections of a morphological structure; set a comparison target portion of the subject image based on the subject image; set a comparison target portion of the standard image based on a comparison between the subject image and the standard image; specify a section in the comparison target portion of the subject image based on a comparison between the comparison target portion of the subject image and the comparison target portion of the standard image; and output the subject image and the section in association with each other.

1. Medical Image Processing Apparatus According to Embodiment

Figure 1:
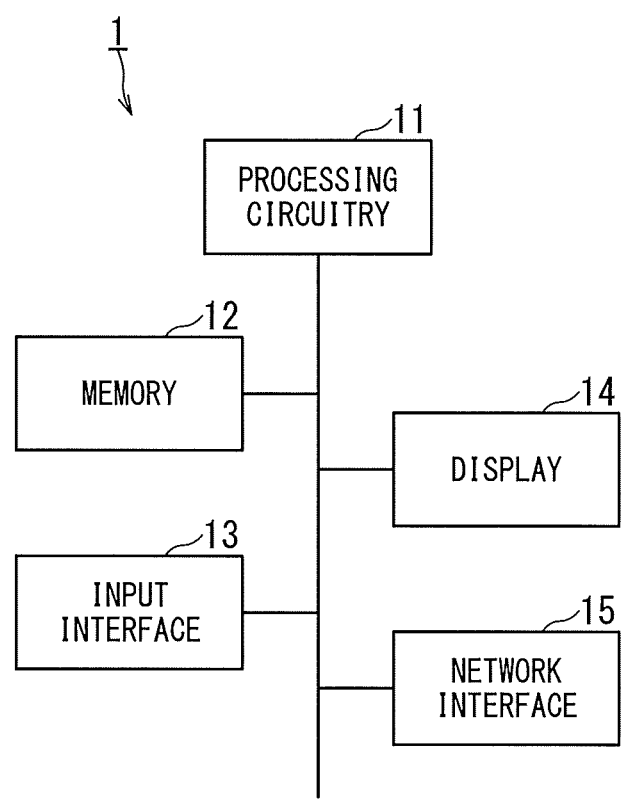
FIG. 1 is a schematic diagram showing a configuration example of a medical image processing apparatus according to an embodiment.

FIG. 1 is a schematic diagram showing a configuration example of a medical image processing apparatus according to an embodiment.

FIG. 1 shows a medical image processing apparatus 1 according to an embodiment. The medical image processing apparatus 1 is a medical image management apparatus (image server), a workstation, a medical image interpretation terminal or the like, and is provided on a medical image system connected via a network. The medical image processing apparatus 1 may be an off-line apparatus.

The medical image processing apparatus 1 includes processing circuitry 11, a memory 12, an input interface 13, a display 14, and a network interface 15.

The processing circuitry 11 means any one of dedicated or general central processing unit (CPU) and a microprocessor unit (MPU), an application specific integrated circuit (ASIC), and a programmable logic device. The programmable logic device may be, for example, any one of a simple programmable logic device (SPLD), a complex programmable logic device (CPLD), a field programmable gate array (FPGA) and the like. The processing circuitry 11 reads programs stored in the memory 12 or directly implemented in the processing circuitry 11 and executes these programs to thereby achieve the following functions.

The processing circuitry 11 may be a single circuit or a combination of separate circuits. In the latter case, each of elements of the memory 12, which stores a program, may be separately provided for each of elements of the processing circuitry 11. Alternatively, a single memory 12 may store the programs corresponding to the functions of the elements of the processing circuitry 11. The processing circuitry 11 is an example of a processing unit.

The memory 12 is constituted by a semiconductor memory element such as a random access memory (RAM), a flash memory, a hard disk, an optical disk, and the like. The memory 12 may be constituted by a portable medium such as a universal serial bus (USB) memory and a digital video disk (DVD). The memory 12 stores various processing programs (including an operating system (OS) and the like besides the application program) used in the processing circuitry 11 and data necessary for executing the programs. In addition, the OS may include a graphical user interface (GUI) that allows graphics to be used to display information on the display 14 corresponding to an operator such as a medical image interpreter and a basic operation can be performed by the input interface 13.

The memory 12 stores a subject image generated by a medical image diagnostic apparatus such as an X-ray computed tomography (CT) apparatus and a magnetic resonance imaging (MRI) apparatus. The memory 12 is an example of a storage unit.

The input interface 13 includes a circuit for inputting a signal from an input device operable by the operator and an input device. The input device may be a trackball, a switch, a mouse, a keyboard, a touch pad for performing an input operation by touching an operation surface, a touch screen in which a display screen and a touch pad are integrated, a non-contact input circuit using an optical sensor, an audio input circuit, or the like. When the input device is operated by the operator, the input interface 13 generates an input signal corresponding to the operation and outputs it to the processing circuitry 11. The medical image processing apparatus 1 may include a touch panel in which the input device is integrated with the display 14. The input interface 13 is an example of an input unit.

The display 14 is a display device such as a liquid crystal display panel, a plasma display panel, and an organic electro luminescence (EL) panel. The display 14 displays the medical image generated under the control of the processing circuitry 11. The display 14 is an example of a display unit. The network interface 15 is constituted by connectors conforming to the parallel connection specification or the serial connection specification. The network interface 15 has a function of performing communication control according to each standard and connecting it to a network through a telephone line so that the medical image processing apparatus 1 is capable of being connected to the network. The network interface 15 is an example of a communication unit.

Figure 2:
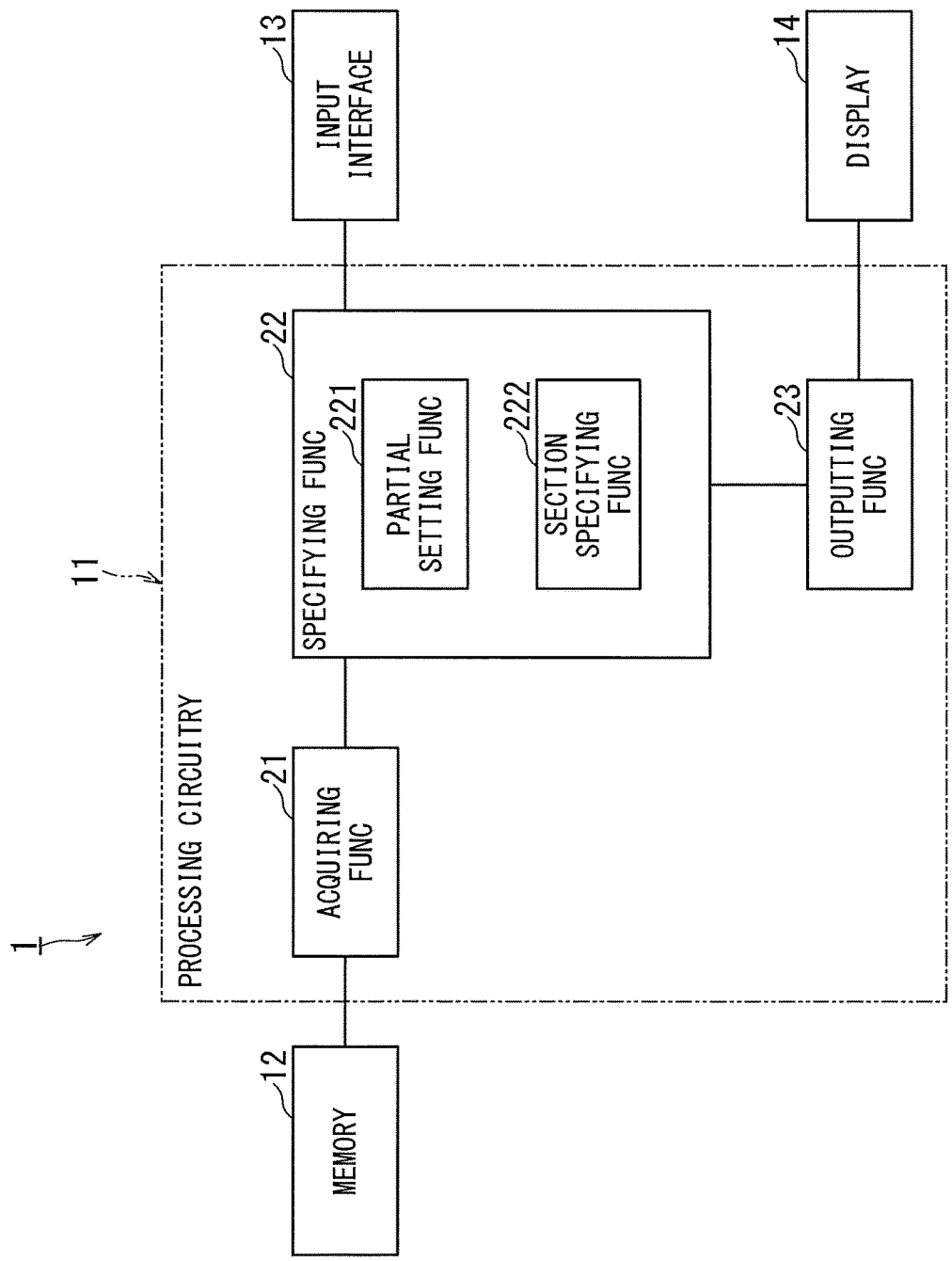
FIG. 2 is a block diagram showing functions of the medical image processing apparatus according to the embodiment.

FIG. 2 is a block diagram showing functions of the medical image processing apparatus 1.

By executing the program by the processing circuitry 11, the medical image processing apparatus 1 realizes an acquiring function 21, a specifying function 22, and an outputting function 23. All or a part of the functions 21 to 23 may be realized as a circuit such as an ASIC in the medical image processing apparatus 1.

The acquiring function 21 includes a function of acquiring a subject image (shown in FIG. 4) from the memory 12, and a function of acquiring a standard image indicating a morphological structure of a human body and sections (hereinafter referred to as "atlas image") of a morphological structure from the memory 12 which stores each standard image in association with the atlas image. The subject image is generated by the medical image diagnostic apparatus such as the X-ray CT apparatus or the MRI apparatus. According to another example, the acquiring function 21 acquires at least one of the subject image and data, associated with the standard image and the atlas image, from a memory (not shown) outside the medical image processing apparatus 1 via the network interface 15.

The specifying function 22 includes a function of performing a parcellation processing on a comparison target portion of the subject image acquired by the acquiring function 21, and a function of specifying a section for a partial image of the subject image. Specifically, the specifying function 22 compares a partial image (shown in FIG. 6B and hereinafter referred to as "partial subject image") of the comparison target portion of the subject image acquired by the acquiring function 21 with a partial image (shown in FIG. 5 and hereinafter referred to as "partial standard image") of the standard image relating to a portion corresponding to the comparison target portion, thereby specifies a section for the comparison target portion of the subject image.

The specifying function 22 has a partial setting function 221 and a section specifying function 222. The partial setting function 221 includes a function of setting a comparison target portion in the subject image based on the subject image acquired by the acquiring function 21, and a function of setting a comparison target portion in the standard image based on a comparison between the subject image and the standard image. The section specifying function 222 includes a function of specifying a section in the comparison target portion of the subject image based on a comparison between the comparison target portion of the subject image, set by the partial setting function 221, and the comparison target portion of the standard image.

The standard image includes a brain region in the same manner as the subject image and means an image serving as a reference of the atlas image (shown in FIG. 5). The atlas image means a parceled image in which the brain region is pre-sectioned based on the standard image. The brain region can be parceled into multiple sections by the structural connectivity, the functional connectivity or the effective connectivity. For example, when the brain region is parceled by the structural connectivity, the brain region can be parceled into the frontal lobe, parietal lobe, occipital lobe, temporal lobe, corpus callosum and the like.

The outputting function 23 includes a function of outputting the subject image acquired by the acquiring function 21 and the section specified by the specifying function 22 in association with each other from the display 14, and a function of outputting the subject image acquired by the acquiring function 21 and the section specified by the specifying function 22 via the network interface 15 to an external device (not shown). For example, the outputting function 23 generates a parceled image (shown in FIG. 10) indicating the section of the comparison target portion specified by the specifying function 22. The outputting function 23 displays the parceled image on the display 14 or transmits it from the network interface 15.

A specific operation of the functions 21 to 23 will be described later with reference to FIGS. 3 to 12.

Figure 3:
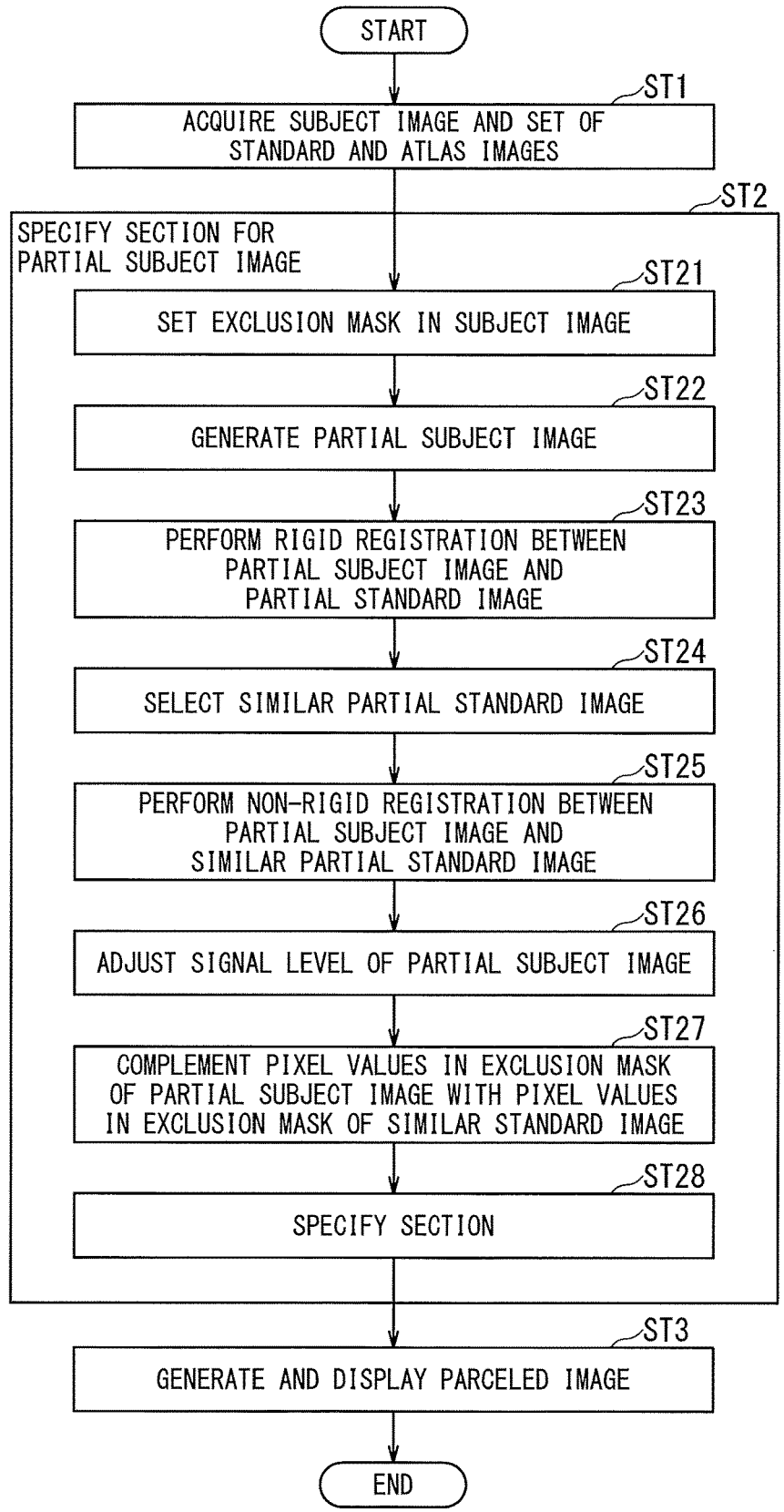
FIG. 3 is a flowchart showing an operation of the medical image processing apparatus according to the embodiment.

FIG. 3 is a flowchart showing an operation of the medical image processing apparatus 1. In FIG. 3, reference numerals with "ST" attached thereto indicate respective steps of the flowchart.

The memory 12 of the medical image processing apparatus 1 stores in advance a subject image and a set of a standard image and an atlas image.

FIG. 4 is a diagram showing an example of the subject image. FIG. 5 is a diagram showing an example of the set of the standard image and the atlas image.

As shown in FIG. 4, a subject image includes a brain region. Further, FIG. 5 shows a standard image including the brain region and an atlas image obtained by parceling the brain region based on the standard image. Since the atlas image is generated based on the standard image, each position corresponds.

Returning to the explanation of FIG. 3, the acquiring function 21 acquires a subject image, a set of a standard image and an atlas image from the memory 12 (step ST1). In step ST1, the acquiring function 21 acquires the subject image shown in FIG. 4 from the memory 12. For example, the subject image is a T1W image including a brain region generated by the MRI apparatus. The T1W image means an image having a contrast emphasizing the difference in the longitudinal relaxation time (T1) between tissues. In addition, the subject image may be a tomographic image in which pixels are two-dimensionally arranged, or volume data in which voxels are three-dimensionally arranged.

The specifying function 22 compares a partial subject image according to the subject image (shown in FIG. 4) acquired in step ST1 with the set of the standard image and the atlas image (shown in FIG. 5), thereby specifies a section for the partial subject image (step ST2).

Specifically, the partial setting function 221 of the specifying function 22 sets an exclusion mask as an exclusion region in the subject image acquired in step ST1 (step ST21). The partial setting function 221 sets a region including an abnormal site of the subject image as the exclusion mask, and sets a region outside the exclusion mask of the subject image as a comparison target portion.

In step ST21, the partial setting function 221 sets the exclusion mask so as to separate the region including the abnormal site due to the lesion and the defect from other regions in the subject image. The region including the abnormal site may be determined by a manual method such that the operator draws a circle or a polygon on the subject image.

In step ST21, the partial setting function 221 may generate the exclusion mask so as to separate a region of the abnormal site itself from the other region in the subject image. That is, in FIG. 6, the code B is the exclusion mask M. In this case, the abnormal site may be determined by an automatic method in which a part having a pixel value (luminance value) in a specific range stored in advance is set as the abnormal site. Alternatively, the abnormal site may be determined by an automatic method such that a part having a large difference from an image stored in advance is the abnormal site.

The section specifying function 222 generates a partial subject image including only the pixel values in the exclusion mask on the basis of the exclusion mask set in step ST21 (step ST22).

Each of FIGS. 6A and 6B is a diagram for explaining a method of generating the partial subject image based on the subject image.

FIG. 6A shows an example of the subject image in which the exclusion mask M is set. As shown in FIG. 6A, the exclusion mask M is set so as to include the whole or a part of the abnormal site B of the subject image. By setting of the exclusion mask M, a partial subject image is generated (shown in FIG. 6B). The pixel value in the exclusion mask M means a non-calculation region in which calculation processing to be described later is not performed.

Returning to the explanation of FIG. 3, the section specifying function 222 performs a rigid registration between the partial subject image and the partial standard image (step ST23) based on the mutual information content (histogram similarity) between the partial subject image generated in step ST21 and on the partial image (hereinafter referred to as "partial standard image") to which the exclusion mask is applied in the standard image. In step ST23, the section specifying function 222 performs the rigid registration between partial subject images corresponding to rotation angles and a partial standard image to which an exclusion mask is applied at a corresponding position of the standard image. The rigid registration means alignment performed by parallel movement, rotational movement, etc., and combinations thereof.

FIG. 7 is a diagram for explaining a method of the rigid registration.

FIG. 7 shows three partial subject images with different rotation angles and three partial standard images with three exclusion masks applied to the standard image. FIG. 7 shows the partial subject image having the exclusion mask M [θ1] rotated by the rotation angle θ1, the partial subject image having the exclusion mask M [θ2] rotated by the rotation angle θ2, and the partial subject image having the exclusion mask M [θ3] rotated by the rotation angle θ3. As the partial subject image rotates, the exclusion mask M is also rotated.

FIG. 7 shows a partial standard image in which the exclusion mask M [θ1] is applied to the standard image at that position, a partial standard image in which the exclusion mask M [θ2] is applied to the standard image at that position, and a partial standard image in which the exclusion mask M [θ3] is applied to the standard image at that position. As a result, the pixel values in the exclusion mask including the abnormal site are excluded from the calculation, and the rigid registration is performed.

As shown in FIG. 7, the mutual information content is calculated between the partial subject image having the exclusion mask M [θ1] and the partial standard image applied with the exclusion mask M [θ1]. The mutual information content is calculated between the partial subject image having the exclusion mask M [θ2] and the partial standard image applied with the exclusion mask M [θ2]. Further, the mutual information content is calculated between the partial subject image having the exclusion mask M [θ3] and the partial standard image applied with the exclusion mask M [θ3].

Specifically, as the mutual information content is larger, it is determined that the relative position of the partial standard image with respect to the partial subject image is higher in similarity. In this manner, by setting the exclusion mask in the subject image, the mutual information content is calculated only by the pixel value outside the exclusion mask.

In the medical image processing apparatus of the comparative example, the rigid registration is performed between the entire subject image including the abnormal site and the entire standard image. In this registration, since the subject image contains the pixel value of the abnormal site, it is impossible to perform an appropriate registration and accurate parcellation processing cannot be performed. Meanwhile, in the medical image processing apparatus 1, the rigid registration is performed between the partial subject image not including the abnormal site and the partial standard image. According to this registration, since the partial subject image does not include an abnormal site, accurate and sensitive parcellation processing is performed.

Returning to the explanation of FIG. 3, the section specifying function 222 uses the hierarchical clustering based on the landmark to select a partial standard image (hereinafter, referred to as "similar partial standard image") having a high degree of similarity with the partial subject image generated in step ST22 out of partial standard images having different exclusion mask positions to be applied (step ST24). Then, the section specifying function 222 performs a non-rigid registration between the partial subject image and the similar partial standard image on the basis of the mutual information content between the partial subject image generated in step ST22 and the similar partial standard image selected in step ST24 (step ST25). It should be noted that non-rigid registration means alignment performed by parallel movement, rotational movement, enlargement, reduction, shearing, etc., and combinations thereof.

In the medical image processing apparatus of the comparative example, the non-rigid registration is performed between the entire subject image including the abnormal site and the whole of the selected standard image. In this registration, since the subject image includes the abnormal site, it is impossible to perform an appropriate registration and accurate parcellation processing cannot be performed. On the other hand, the medical image processing apparatus 1 performs the non-rigid registration between the partial subject image not including the abnormal site and the selected partial standard image. According to this registration, since the partial subject image does not include an abnormal site, it is possible to perform an appropriate registration, so that it is possible to perform accurate and sensitive parcellation processing.

The section specifying function 222 adjusts a signal level of the partial subject image after being aligned in step ST25 (step ST26). It is assumed that the partial subject image and the similar partial standard image have the same contrast between tissues, but the pixel values themselves may have different values depending on the imaging situation. Therefore, in order to make the signal level of the partial subject image uniform to the signal level of the similar partial standard image in step ST26, the section specifying function 222 performs the linear conversion of pixel values based on the maximum value and the minimum value of each partial image. The operation of step ST26 is performed as necessary.

FIG. 8 is a graph showing a conversion formula for linearly converting pixel values.

FIG. 8 shows a conversion equation (y=ax+b) for aligning the pixel values of the partial subject image to the similar partial standard image. In this example, the pixel values of the partial subject image is adjusted so that the maximum value of the pixel values of the partial subject image matches the maximum value of the pixel values of the partial standard image, and the pixel values of the partial subject image is adjusted so that the minimum value of the pixel values of the partial subject image matches the minimum value of the pixel values of the partial standard image.

Returning to the explanation of FIG. 3, the section specifying function 222 complements pixel values in the exclusion mask of the partial subject image after the signal level has been adjusted in step ST26 with pixel values in the exclusion mask of a standard image (hereinafter referred to as "similar standard image") corresponding to the partial standard image (step ST27). The operation of step ST 27 is performed as necessary.

FIG. 9 is a diagram for explaining a method of complementing pixel values.

FIG. 9 shows the partial subject image after the signal level adjustment and the similar standard image after the signal level adjustment. In the partial subject image, the shape of the exclusion mask is deformed from the shape shown in FIG. 7 by the non-rigid registration. In the similar standard image, the shape of the region corresponding to the exclusion mask is deformed from the shape shown in FIG. 7 by the non-rigid registration.

The pixel values of the region corresponding to the exclusion mask of the similar standard image are restored by moving the position of each pixel value in the region corresponding to the exclusion mask before non-rigid registration, according to non-rigid registration. Then, the pixel values in the exclusion mask of the partial subject image shown on the left side of FIG. 9 is complemented (overwritten) with the pixel values of the region corresponding to the exclusion mask of the similar standard image.

Returning to the explanation of FIG. 3, the section specifying function 222 specifies a section for a new subject image complemented in step ST27 using the Maximum A Posteriori (MAP) estimation (step ST28).

In step ST28, the section specifying function 222 specifies the section in at least the region outside the exclusion mask of the partial subject image after being complemented. By specifying the section, the medical image processing apparatus 1 is able to calculate the area or volume of each section, and thereby present it to the operator. Alternatively, the medical image processing apparatus 1 is able to generate a parceled image showing each section by the later-described step ST3 and present it to the operator.

In the MAP estimation in step ST28, the probability estimation of the section using the pixel values of the subject image is performed. However, since it is assumed that the inside of the exclusion mask of the subject image is an abnormal pixel value, it is impossible to use the whole of the subject image for specifying the section. Therefore, the pixel values of the standard image having the highest similarity in the similar atlas selection by the hierarchical clustering based on the landmark is used as the usual pixel values in the absence of the abnormal site. Since the non-rigid registration and the adjustment of the signal level have already been performed on the similar standard image, it can be expected that the similar standard image is complemented by pixel values of substantially the same position and almost the same signal level.

The outputting function 23 generates a parceled image indicating the section of the comparison target portion specified in step ST2 and displays it on the display 14 (step ST3). In the present embodiment, when the subject image, the standard image, and the atlas image are volume data, the outputting function 23 generates a spatial distribution image indicating the spatial distribution of the section as the parceled image in step ST3, and displays the spatial distribution image on the display 14.

Each of FIGS. 10A and 10B is a diagram showing an example of the parceled image.

FIG. 10A shows a parceled image indicating the section of the comparison target portion. The parceled image is generated based on the non-complemented partial subject image shown on the left side of FIG. 9. Since the exclusion mask does not correspond to the subject image having the abnormal site, a constant pixel value, for example, "0" is given within the exclusion mask.

FIG. 10B shows a parceled image showing the section of the comparison target portion and the section of the region corresponding to the exclusion mask. The parceled image is generated based on the complemented partial subject image shown on the left side of FIG. 9. The exclusion mask does not correspond to the subject image having the abnormal site, but the pixel values indicating the section are given within the exclusion mask.

In the present embodiment, it is preferable that the region in the exclusion mask shown in FIG. 10B is distinguishably displayed from the region outside the exclusion mask. In FIG. 10B, the region in the exclusion mask and the region outside the exclusion mask can be distinguished between inside and outside the broken line. It should be noted that it is possible to express the regions inside and outside the exclusion mask in different colors, or to display the image shown in FIG. 10B and the original subject image side by side.

Further, the case where the subject image includes the brain region has been described, but the present invention is not limited to that case. For example, it suffices that the image is a subject image including a site where the section is separated, for example, the subject image may include other organs such as liver or lung. The type of subject image is not limited to the T1W image. For example, the type of the subject image may be another image generated by the MRI apparatus. The type of the subject image may be an image generated by another medical image diagnostic apparatus (for example, an X-ray CT apparatus, a nuclear medicine diagnostic apparatus, or an ultrasonic diagnostic apparatus).

According to the medical image processing apparatus 1, an appropriate standard image is selected on the basis of the partial subject image which is the part of the subject image to be parceled, and it is possible to accurately parcel the subject image with high accuracy since the selected standard image and the partial subject image are aligned and the parcellation processing is performed. Further, according to the medical image processing apparatus 1, there is no need to repeat some parcellation processing under different conditions until the accurate result is obtained, so the processing load of the processing circuitry 11 is also reduced.

2. First Application Example for Specifying Section

The appropriate parceled image is generated for the subject image in step ST3 of FIG. 3. Thereby, from the relationship between the position of the abnormal site and the position of the section, the brain region affected by the abnormal site is estimated.

FIG. 11 is a diagram showing an example of the parceled image.

FIG. 11 shows a parceled image showing the abnormal site B. By displaying the parceled image shown in FIG. 11, it is possible for the operator to accurately estimate what kind of brain function (section) may be affected by the abnormal site B. Alternatively, it is possible for the operator to accurately estimate what kind of symptom is likely to occur.

3. Second Application Example for Specifying Section

The appropriate parceled image is generated for the subject image in step ST3 of FIG. 3. Thereby, it is possible to automatically and quantitatively measure the area or volume of each brain region (each section) even for the subject image including the abnormal site. It is possible to evaluate cerebral atrophy useful for a diagnosis of a neurodegenerative disease or the like on the subject image including the abnormal site 4. Third Application Example for Specifying Section In DTI (Diffusion Tensor Imaging) which is an imaging method using an MRI apparatus, a tractography in which nerve running is drawn is generated.

FIG. 12 is a diagram showing an example of the tractography.

FIG. 12 shows a tractography in which nerve running (tract) N is depicted. The operator designates a start ROI (Region Of Interest), a relay ROI, and a termination ROI of the nerve running with respect to the brain image. Thereby, it is possible to obtain a tractography in which a specific nerve running through each ROI is depicted. For example, by designating the two sections P1 and P2 as the start ROI and the terminal ROI, it is possible to obtain a tractography in which the nerve running N with end points of the sections P1 and P2 is depicted. The appropriate parceled image is generated for the subject image in step ST3 of FIG. 3, and the sections are set as the start ROI, the relay ROI and the termination ROI of nerve running. As a result, it is possible to express the nerve running extremely easily as compared with the case where the ROI is manually specified.

In addition, even when the abnormal site is included in step ST2 of FIG. 3, an appropriate section is specified, so even in that case, it is possible to acquire the tractography extremely easily.

The tractography is used especially in brain surgical planning. Specifically, it is used to confirm nerve running of a patient before surgery so as not to hurt important nerves. Since patients who are subject to surgery often have abnormalities such as brain tumors and the subject image often includes abnormal sites, so the usefulness of specifying the section in the embodiment is great.

5. Medical Image Diagnostic Apparatus According to Embodiment

With FIGS. 1 to 12, the parcellation processing of the subject image using the medical image processing apparatus such as a workstation or the like has been described. However, the apparatus that performs the parcellation processing of the subject image is not limited to the medical image processing apparatus. For example, it is also possible to perform the parcellation processing of the subject image in a medical image diagnostic apparatus such as an MRI apparatus, an X-ray CT apparatus, a nuclear medicine diagnostic apparatus, or an ultrasonic diagnostic apparatus that generates a subject image.

FIG. 13 is a schematic diagram showing a configuration example of the medical image diagnostic apparatus according to the embodiment.

FIG. 13 shows a medical image diagnostic apparatus 51 according to the embodiment. The medical image diagnostic apparatus 51 is an MRI apparatus, an X-ray CT apparatus, or the like, and is provided on a medical image system connected via a network. The medical image diagnostic apparatus 51 may be an offline apparatus.

The medical image diagnostic apparatus 51 includes an imaging device 61 and a console 62. In the case where the medical image diagnostic apparatus 51 is an MRI apparatus, the imaging device 61 includes a static magnetic field magnet, a gradient magnetic field coil, an RF (Radio Frequency) coil, a bed, and the like, and generates raw data which is the basis of the subject image related to the patient. The console 62 generates a subject image, for example, a T1W image based on the raw data. The imaging device 61 is also called a scanner. The imaging device 61 is usually installed in an examination room, while the console 62 is usually installed in a control room adjacent to the examination room.

The console 62 includes processing circuitry 71, a memory 72, an input interface 73, a display 74, and a network interface 75. The configurations of the processing circuitry 71, the memory 72, the input interface 73, the display 74, and the network interface 75 are the same as the configurations of the processing circuitry 11, the memory 12, the input interface 13, the display 14, and the network interface 15 shown in FIG. 1, respectively, so the description thereof will be omitted.

FIG. 14 is a block diagram showing functions of the medical image diagnostic apparatus 51.

As the processing circuitry 71 executes the program, the medical image diagnostic apparatus 51 realizes a subject image generating function 80, an acquiring function 81, a specifying function 82, and an outputting function 83. All or a part of the functions 80 to 83 may be realized as a circuit such as an ASIC in the medical image diagnostic apparatus 51.

The subject image generating function 80 includes a function of controlling an operation of the imaging device 61 to cause the patient to perform imaging and to generate a subject image, and a function of storing the subject image in the memory 72.

The specifying function 82 has a partial setting function 821 and a section specifying function 822.

Since the acquiring function 81, the specifying function 82, and the outputting function 83 are the same functions as the acquiring function 21, the specifying function 22, and the outputting function 23 shown in FIG. 2, respectively, so the description thereof will be omitted. Since the partial setting function 821 and the section specifying function 822 have the same functions as the partial setting function 221 and the section specifying function 222 shown in FIG. 2, respectively, so the description thereof will be omitted. An operation of the medical image diagnostic apparatus 51 after the subject image generating function 80 executes the imaging, generates the subject image and stores it in the memory 72 is equivalent to the operation shown in the flowchart of FIG. 3, so the description thereof will be omitted.

According to the medical image diagnostic apparatus 51, an appropriate standard image is selected on the basis of the partial subject image which is the part of the subject image to be parceled, and it is possible to accurately parcel the subject image with high accuracy since the selected standard image and the partial subject image are aligned and the parcellation processing is performed. Further, according to the medical image diagnostic apparatus 51, there is no need to repeat some parcellation processing under different conditions until the accurate result is obtained, so the processing load of the processing circuitry 71 is also reduced.

6. Medical Image Processing System According to Embodiment

With FIGS. 1 to 14, the parcellation processing of the subject image in one apparatus has been described. However, the parcellation processing of the subject image may be performed by a system including multiple physically dispersed devices.

FIG. 15 is a schematic diagram showing a configuration example and functions showing a medical image processing system according to an embodiment.

FIG. 15 shows a medical image processing system S according to an embodiment. The medical image processing system S includes a client acquiring a subject image obtained from a subject, for example, the console 62 of the medical image diagnostic apparatus 51 shown in FIG. 13, and an image processing server 101. The console 62 and the image processing server 101 are provided so as to be able to communicate with each other via the network NW. It should be noted that the client is not limited to the console 62 of the medical image diagnostic apparatus 51 but may be a device not including the imaging device 61 such as a work station, an image interpretation terminal, or the like.

The image processing server 101 includes processing circuitry 111, a memory 112, an input interface 113, a display 114, and a network interface 115. The configurations of the processing circuitry 111, the memory 112, the input interface 113, the display 114, and the network interface 115 are the same as the configurations of the processing circuitry 11, the memory 12, the input interface 13, the display 14, and the network interface 15 shown in FIG. 1, respectively, so the description thereof will be omitted.

The processing circuitry 71 of the console 62 and the processing circuitry 111 of the image processing server 101 are able to perform the processing by the functions 80 to 83 shown in FIG. 14 in a shared manner. That is, any one of the processing circuitry 71 of the console 62 and the processing circuitry 111 of the image processing server 101 has a subject image acquiring function 81A which is a part of the acquiring function 81, and the function 81A acquires the subject image. Any one of the processing circuitry 71 and the processing circuitry 111 has a standard image acquiring function 81B which is a part of the acquiring function 81, the function 81B acquiring the standard image and the sections of the morphological structure from the memory which stores a standard image indicating the morphological structure of the human body and the sections of the morphological structure in association with each other. Any one of the processing circuitry 71 and the processing circuitry 111 has the specific function 82. The function 82 sets a comparison target portion in the subject image based on the subject image, sets the comparison target portion in the standard image based on a comparison between the subject image and the standard image, and specifies a section in the comparison target portion of the subject image based on a comparison between the comparison target portion of the subject image and the comparison target portion of the standard image. Any one of the processing circuitry 71 and the processing circuitry 111 has the outputting function 83, the function 83 outputting the subject image and the section in association with each other.

For example, the processing circuitry 71 of the console 62 includes the subject image generating function 80, the subject image acquiring function 81A, and the outputting function 83. In addition, the processing circuitry 71 includes a transmission/reception function 84 for controlling transmission and reception of data with the image processing server 101. On the other hand, the processing circuitry 111 of the image processing server 101 includes the standard image acquiring function 81B and the specific function 82. In addition, the processing circuitry 111 includes a transmission/reception function 85 for controlling transmission and reception of data with the console 62.

That is, the subject image acquiring function 81A of the console 62 acquires the subject image, and the transmission/reception function 84 transmits the subject image to the image processing server 101. The standard image acquiring function 81B of the image processing server 101 acquires the standard image and the sections of the morphological structure from the memory 112. The specifying function 82 of the image processing server 101 sets the comparison target portion in the subject image based on the subject image transmitted from the console 62, sets the comparison target portion in the standard image based on the comparison between the subject image and the standard image, and specifies the section in the comparison target portion of the subject image. The transmission/reception function 85 of the image processing server 101 transmits the section to the console 62.

The transmission/reception function 84 of the console 62 receives the specified section transmitted from the image processing server 101. The outputting function 83 of the console 62 displays the subject image and the received section in correspondence with each other from the display 74 of the console 62.

It should be noted that an operation of the medical image processing system S after the subject image generating function 80 executes the imaging, generates the subject image and stores it in the memory 72 is equivalent to the operation shown in the flowchart of FIG. 3, so the description thereof will be omitted.

According to the medical image processing system S, an appropriate standard image is selected on the basis of the partial subject image which is the part of the subject image to be parceled, and it is possible to accurately parcel the subject image with high accuracy since the selected standard image and the partial subject image are aligned and the parcellation processing is performed. Further, according to the medical image processing system S, there is no need to repeat some parcellation processing under different conditions until the accurate result is obtained, so the processing load of the processing circuitry 71 and 111 is also reduced.

According to at least one of the embodiments described above, it is possible to accurately and precisely perform a parcellation processing on a subject image.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A medical image processing apparatus comprising: processing circuitry configured to
   acquire a subject image relating to a subject,
   acquire a standard image indicating a morphological structure of a human body and sections of a morphological structure from a memory which stores each standard image in association with sections of a morphological structure,
   set a comparison target portion of the subject image based on the subject image,
   set a comparison target portion of the standard image based on a comparison between the subject image and the standard image,
   specify a section in the comparison target portion of the subject image based on a comparison between the comparison target portion of the subject image and the comparison target portion of the standard image, and
   output the subject image and the section in association with each other.

2. The medical image processing apparatus according to claim 1, wherein
   the processing circuitry is configured to
      set a region including an abnormal site of the subject image as an exclusion region, and
      set a region outside the exclusion region of the subject image as the comparison target portion.

3. The medical image processing apparatus according to claim 2, wherein
   the processing circuitry is configured to further generate a parceled image indicating the section of the comparison target portion.

4. The medical image processing apparatus according to claim 3, wherein
   the processing circuitry is configured to
      complement pixel values in the excluded region of the subject image with pixel values of the standard image in a region corresponding to the excluded region, and thereby specify a section for the excluded region of the subject image, and
      generate, as the parceled image, an image indicating the section of the comparison target part and the section of the exclusion region of the subject image.

5. The medical image processing apparatus according to claim 4, wherein
   the processing circuitry is configured to
      generate a spatial distribution image showing a spatial distribution of the section as the parceled image, and
      display the spatial distribution image on a display.

6. The medical image processing apparatus according to claim 5, wherein
   the processing circuitry is configured to distinguishably display the comparison target portion and the exclusion region on the display.

7. The medical image processing apparatus according to claim 1, wherein
   the processing circuitry is configured to generate a partial subject image related to the comparison target portion of the subject image and a partial standard image related to the comparison target portion of the standard image.

8. The medical image processing apparatus according to claim 7, wherein
   the processing circuitry is configured to
      set a region including the abnormal site of the subject image as the exclusion region,
      set a region outside the exclusion region of the subject image as the comparison target portion, and
      perform a rigid registration between the partial subject image and the partial standard images having different positions of the exclusion region, and thereby perform the comparison by selecting the partial standard image out of the partial standard images.

9. The medical image processing apparatus according to claim 7, wherein
   the processing circuitry is configured to perform the comparison by performing a non-rigid registration between the partial subject image and the partial standard image.

10. The medical image processing apparatus according to claim 7, wherein
    the processing circuitry is configured to perform the comparison by performing a processing to adjust a signal level of the partial subject image to a signal level of the partial standard image.

11. The medical image processing apparatus according to claim 1, wherein
    the subject image is a T1W image including a brain region.

12. The medical image processing apparatus according to claim 1, wherein
the processing circuitry is configured to
generate the subject image by executing imaging by controlling an operation of an scanner, and
store the subject image to a memory.

13. A method for processing a medical image, comprising:
acquiring a subject image relating to a subject;
acquiring a standard image indicating a morphological structure of a human body and sections of a morphological structure from a memory which stores each standard image in association with sections of a morphological structure;
setting a comparison target portion of the subject image based on the subject image;
setting a comparison target portion of the standard image based on a comparison between the subject image and the standard image;
specifying a section in the comparison target portion of the subject image based on a comparison between the comparison target portion of the subject image and the comparison target portion of the standard image; and
outputting the subject image and the section in association with each other.

14. A medical image processing system including a server and a client for acquiring a subject image relating to a subject, comprising:
any one of processing circuitry of the server and processing circuitry of the client configured to acquire the subject image;
any one of processing circuitry of the server and processing circuitry of the client configured to acquire a standard image indicating a morphological structure of a human body and sections of a morphological structure from a memory which stores each standard image in association with sections of a morphological structure;
any one of processing circuitry of the server and processing circuitry of the client configured to set a comparison target portion of the subject image based on the subject image;
any one of processing circuitry of the server and processing circuitry of the client configured to set a comparison target portion of the standard image based on a comparison between the subject image and the standard image;
any one of processing circuitry of the server and processing circuitry of the client configured to specify a section in the comparison target portion of the subject image based on a comparison between the comparison target portion of the subject image and the comparison target portion of the standard image; and
any one of processing circuitry of the server and processing circuitry of the client configured to output the subject image and the section in association with each other.

15. The medical image processing system according to claim 14, wherein
the processing circuitry of the client configured to
acquire the subject image, and
transmit the subject image to the server,
the processing circuitry of the server configured to
acquire the standard image and the sections of the morphological structure from a memory of the server,
set the comparison target portion in the subject image based on the subject image transmitted from the client,
set the comparison target portion in the standard image based on the comparison between the subject image and the standard image,
specify the section in the comparison target portion of the subject image, and
transmit the section to the client, and
the processing circuitry of the client configured to
output the subject image and the section transmitted from the server in association with each other.

* * * * *